US011857817B2

(12) United States Patent
Agan et al.

(10) Patent No.: US 11,857,817 B2
(45) Date of Patent: *Jan. 2, 2024

(54) LOW PRESSURE DROP ACOUSTIC SUPPRESSOR NOZZLE FOR INERT GAS DISCHARGE SYSTEM

(71) Applicant: Tyco Fire Products LP, Lansdale, PA (US)

(72) Inventors: Arash Agan, Providence, RI (US); Melissa Ann Figueiredo Loureiro, Pawtucket, RI (US); Michael David Mulzer, Peshtigo, WI (US); Derek M. Sandahl, Wallace, MI (US)

(73) Assignee: Tyco Fire Products LP, Cranston, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/837,485

(22) Filed: Jun. 10, 2022

(65) Prior Publication Data

US 2022/0305310 A1 Sep. 29, 2022

Related U.S. Application Data

(63) Continuation of application No. 15/550,517, filed as application No. PCT/US2016/064768 on Dec. 2, 2016, now Pat. No. 11,389,678.

(Continued)

(51) Int. Cl.

| | |
|---|---|
| ***A62C 31/05*** | (2006.01) |
| ***A62C 99/00*** | (2010.01) |
| ***F15B 21/00*** | (2006.01) |

(52) U.S. Cl.

CPC .......... *A62C 31/05* (2013.01); *A62C 99/0018* (2013.01); *F15B 21/008* (2013.01)

(58) Field of Classification Search

CPC .. F01N 2240/18; F01N 2310/06; F01N 13/00; F01N 13/007; F01N 1/24;

(Continued)

(56) References Cited

U.S. PATENT DOCUMENTS

| | | | | |
|---|---|---|---|---|
| 3,635,309 A * | 1/1972 | Nemcansky | ............ | F01B 31/16 181/267 |
| 4,134,472 A | 1/1979 | Trainor | | |

(Continued)

FOREIGN PATENT DOCUMENTS

| | | |
|---|---|---|
| CN | 102573998 A | 7/2012 |
| EP | 1 151 800 | 11/2001 |

(Continued)

OTHER PUBLICATIONS

ANSI/UL 2127, "Standard for Inert Gas Clean Agent Extinguishing System Units," Second Edition.

(Continued)

*Primary Examiner* — Jason J Boeckmann

(74) *Attorney, Agent, or Firm* — Foley & Lardner LLP

(57) ABSTRACT

A fire suppression nozzle includes a first conduit including an inlet and an outlet, a second conduit coupled to the first and including a plurality of outlets spaced apart from a second plurality of outlets. The nozzle includes a first annular sound absorbing member positioned on a first side of the outlet and a second annular sound absorbing member positioned on a second side of the outlet wherein the first conduit provides inert gas to the second conduit. The inert gas exits the outlet in a first direction and a first portion of the inert gas is directed toward the first plurality of outlets in a second direction and a second portion is directed toward the second plurality of outlets in a third direction opposite the second direction, wherein the second and third directions are generally perpendicular to the first direction.

23 Claims, 7 Drawing Sheets

Related U.S. Application Data

(60) Provisional application No. 62/379,069, filed on Aug. 24, 2016, provisional application No. 62/263,300, filed on Dec. 4, 2015.

(58) Field of Classification Search
CPC ..... F01B 31/16; A62C 31/02; A62C 99/0027; A62C 99/0018; A62C 31/05
USPC ............ 239/462, 518, 520; 169/11; 181/230
See application file for complete search history.

(56) References Cited

U.S. PATENT DOCUMENTS

| | | | |
|---|---|---|---|
| 6,739,426 B2 | 5/2004 | Sherikar et al. | |
| 7,753,167 B2 | 7/2010 | Fukano et al. | |
| 8,887,820 B2 | 11/2014 | Hill et al. | |
| 9,404,365 B2 | 8/2016 | Taylor et al. | |
| 9,457,214 B2 | 10/2016 | Goto | |
| 10,507,343 B2 | 12/2019 | Agan et al. | |
| 2003/0221906 A1 | 12/2003 | Sherikar et al. | |
| 2005/0126139 A1 | 6/2005 | Sewell | |
| 2006/0243460 A1 | 11/2006 | Geyer | |
| 2009/0266643 A1* | 10/2009 | Fukano | F04B 39/0033 181/258 |
| 2011/0180276 A1 | 7/2011 | Khalil et al. | |
| 2012/0205128 A1 | 8/2012 | Goto | |
| 2013/0292140 A1 | 11/2013 | Inoue et al. | |
| 2015/0306437 A1 | 10/2015 | Hunter et al. | |
| 2018/0272166 A1 | 9/2018 | Ahmadzadegan et al. | |
| 2018/0272167 A1 | 9/2018 | Ahmadzadegan et al. | |
| 2020/0114185 A1 | 4/2020 | Agan et al. | |

FOREIGN PATENT DOCUMENTS

| | | |
|---|---|---|
| EP | 1 837 488 A1 | 9/2007 |
| EP | 2 491 984 A1 | 8/2012 |
| WO | WO-2012/154652 A1 | 11/2012 |

OTHER PUBLICATIONS

International Search Report and Written Opinion on PCT/US2016/064753, dated Feb. 27, 2017, 18 pages.
International Search Report and Written Opinion on PCT/US2016/064768, dated Feb. 23, 2017, 13 pages.
NFPA 2001: Standard on Clean Agent Fire Extinguishing Systems, 2015 Edition.

* cited by examiner

LOW PRESSURE DROP ACOUSTIC SUPPRESSOR NOZZLE FOR INERT GAS DISCHARGE SYSTEM

CROSS-REFERENCE TO RELATED APPLICATIONS

This application is a continuation of U.S. application Ser. No. 15/550,517, which was the National Stage of International Application No. PCT/US2016/064768 filed Dec. 2, 2016, which claims the benefit of and priority to U.S. Provisional Application No. 62/263,300, filed Dec. 4, 2015 and U.S. Provisional Application No. 62/379,069, filed Aug. 24, 2016, each of which is incorporated by reference in its entirety.

TECHNICAL FIELD

This patent application is directed to fire protection systems and devices and, more specifically, to low pressure drop acoustic suppressor nozzles for inert gas discharge systems.

BACKGROUND

Inert gas fire suppression systems are often used to protect equipment that can get damaged by use of traditional suppression systems that use water, foams and powders. For example, inert gas fire suppression systems can be used to protect electronic equipment such as, e.g., personal computers, servers, equipment found in large data storage centers, and network switches to name just a few. A typical fire suppression system includes a high pressure inert gas source that is connected to one or more inert gas discharge nozzles via piping. A given fire suppression nozzle has an effective protection height and a maximum coverage area, i.e., the area in which the nozzle is effective in suppressing a fire. Depending on the area of coverage, one or more of the nozzles are installed in an enclosed space to protect the enclosure. In case of a fire, a detector triggers the system and a control valve is opened to send high pressure inert gas to the nozzles. Depending on the system, the high pressure source can be connected to more than one enclosure, through pipe network ending in multiple nozzles, and the flow to each enclosure is individually controlled via respective control valves.

Industry regulations require that the fire suppression systems meet certain standards. For example, "NFPA 2001: Standard on Clean Agent Fire Extinguishing Systems," 2015 Edition (hereinafter "NFPA 2001"), which is incorporated herein by reference in its entirety as background, provides the requirements for clean agent fire extinguishing systems. Section 5.8 of NFPA 2001 generally states that the nozzle needs to be designed for the intended use and selected based on the limitations concerning size of the enclosure, the floor coverage and alignment. Section 5.4.2 of NFPA 2001 requires that the method for flame extinguishment and the suppression agent concentration conform to ANSI/UL 2127, "Standard for Inert Gas Clean Agent Extinguishing System Units," Second Edition (hereinafter "UL 2127"), which is incorporated herein by reference in its entirety as background. UL 2127 states that the extinguishing system must suppress the fire within 30 seconds after completion of agent discharge and provides requirements on the construction of the test enclosure and the locations in the enclosure for measuring the agent concentration. According to UL 2127, the test enclosure to be constructed must have the maximum area coverage for the extinguishing system or nozzle and the minimum and maximum protected area height limitations. Thus, each fire suppression nozzle that is compliant with UL 2127 is rated for a maximum area coverage and a minimum/maximum protection height.

In order for the fire suppression nozzle to provide the coverage area and protection height and reduce the oxygen content in the enclosure in compliance with UL 2127, a large amount of inert gas is discharged into the enclosed area in a short period of time. To accomplish this, typically, the inert gas suppression systems often discharge the inert gas at supersonic velocities. The supersonic velocities create significant turbulence, resulting in a high power broadband spectrum of sound. That is, the high velocity gas flowing from the inert gas discharge nozzles can result in very high levels of sound. However, certain electronic components with sensitive mechanical parts (e.g., hard disc drives) are susceptible to adverse effects from high levels of sound. The high sound levels can reduce the performance of these components, and in some cases, the components may stop functioning altogether. Although the computer equipment can be shut down to protect the sound sensitive components, in many cases, if the enclosure houses critical computer systems where downtime is unacceptable due to, e.g., economic or safety reasons, the computer equipment is kept operational even while the nozzle discharges the inert gas. Thus, while electronic equipment in an enclosure may be unaffected by the fire itself, the equipment can still experience damage and thus downtime due to the high sound levels from the inert gas discharge.

Previous attempts in the industry to reduce the high levels of sound associated with the high velocity/high pressure gas discharge have primarily dealt with restricting the flow rate of gas into the enclosed area. For example, previous designs have included blocking the flow inside the nozzle using sound absorbing materials. However, to effectively reduce the sound level of the gas to an acceptable range, e.g., to levels that prevent hard disk failures, the flow rate needs to be significantly reduced, which typically means a high pressure drop in the nozzle. The resulting reduction in the flow rate prevents the gas from being discharged fast enough to quickly reduce the oxygen level and meet current fire suppression standards. Thus, previous attempts to reduce the sound output of the fire suppression nozzles have resulted in a decreased effective coverage for the nozzle. That is, in an attempt to produce a reduced-sound nozzle, the related art nozzles have decreased the maximum coverage area and/or the maximum protection height. Accordingly, a greater number of the related art reduced-sound nozzles may be needed in order to have the same coverage area as existing fire suppression nozzles. In addition, because the coverage area is less, the related art reduced-sound nozzles cannot directly replace, i.e., retrofit, existing fire suppression nozzles that have already been installed in enclosures without substantial modifications to the system, e.g., by running new piping to install additional nozzles.

Accordingly, there is a need for fire suppression nozzles that can quickly discharge gases and reduce the sound generated during discharge to acceptable levels for electronic equipment. In addition, there is also a need to retrofit existing fire suppression nozzles with reduced-sound nozzles without substantial modifications to the existing systems. Further limitations and disadvantages of conventional approaches to inert gas nozzle configurations will become apparent to one skilled in the art through comparison of such approaches with embodiments of the present invention as set forth in the remainder of the present disclosure with reference to the drawings.

SUMMARY

Embodiments of the present invention are directed to low pressure drop acoustic suppressor nozzles for use in fire protection systems. The disclosed low pressure drop acoustic suppressor nozzles are particularly suitable for use in fire protection systems. For example, preferred embodiments of the low pressure drop acoustic suppressor nozzle are suitable for fire protection systems that protect sound sensitive equipment, such as, e.g., computers. The nozzles are directed to reducing sound associated with gas flow and have a sound power that is preferably no greater than 130 dB, more preferably no greater than 125 dB and even more preferably no greater than 108.6 dB. "Sound power" as used herein means the sound level generated by the nozzle. Typically, when the sound level is provided for fire suppression nozzles, it is sound level that has been measured at a known distance from the nozzle. However, such sound measurement readings can be misleading with respect to the actual sound level generated by the nozzle, because the measured sound level can be affected by the characteristics of the enclosure and for other reasons. For example, measurement of sound at a given one location can be inaccurate due to potential sound absorption impact from the enclosure construction, distance from the nozzle, and/or obstructions between the nozzle and the measurement location, which may not be disclosed or accounted for in the reported sound measurement reading. Thus, the measured sound level may not accurately describe the actual sound level generated by the nozzle. The calculation of the sound power level of an object is routine for those skilled in the art and thus will not be discussed herein.

Preferred embodiments of the nozzles discussed herein include nozzles tested incompliance with UL 2127. The sound power values, frequency values, pressure values, coverage values, flow values, and physical dimensions associated with various preferred embodiments are given in nominal values. These nominal values include a range of commercially acceptable values around the nominal. For example, sound power values can range, ±5%, frequency values can range, ±10%, pressure values can range ±5%, coverage values (e.g., area and height) can range ±5%, flow values can range ±10%, and the values for physical dimensions can range ±10%; around the nominal value.

Preferred embodiments of the nozzles disclosed herein are configured such that gas exiting a plurality of outlet holes is balanced such that a ratio between a maximum flow value in the plurality of outlet holes and a minimum flow value in the plurality of outlet holes is less than 70:30, and more preferably 60:40 and even more preferably substantially equal. Preferably, the nozzle is configured such that the plurality of outlet holes are grouped into two or more sets of outlet holes having balanced flow between the sets, and a ratio between a maximum set flow value and a minimum set flow value in the two or more sets of outlet holes is less than 70:30, and more preferably 60:40 and even more preferably substantially equal. Preferably, the plurality of outlet holes are disposed along a longitudinal axis of a chamber of the nozzle, and the nozzle is configured to provide the balanced flow regardless of the orientation and configuration of the plurality of outlet holes along the longitudinal axis. In some preferred embodiments, the nozzle directs inert gas flow in a passageway in a direction transverse to the inert gas flow in the passageway and then divide the transverse inert gas flow into two or more balanced gas flow portions that each flow between opposed sound absorbing surfaces, the nozzle is configured to provide the balanced flow regardless of the orientation and configuration of the plurality of outlet holes along the longitudinal axis. In some preferred embodiments, the nozzle directs inert gas flow in a passageway in a direction transverse to the inert gas flow in the passageway and then divide the transverse inert gas flow into two or more balanced gas flow portions that each flow between opposed sound absorbing surfaces, respectively. Preferably, a ratio between the maximum flow value and the minimum flow value in the two or more balanced gas flow portions is less than 70:30, and more preferably, less than 60:40, and even more preferably, the two balanced gas flow portions are substantially equal.

In an exemplary embodiment, a fire suppression system includes an inert gas source to supply inert gas to an enclosure via distribution piping. The system includes a nozzle that is installed in the enclosure. The nozzle includes an inlet that connects to the distribution piping and includes a plurality of outlet holes. Preferably, during discharge of the inert gas, the sound power level from the nozzle is no greater than 125 dB for a frequency range from 500 to 10,000 Hz for a coverage area up to 36 ft.×36 ft., and more preferably up to 32 ft.×32 ft. Preferably, during the discharge, a pressure drop from the inlet of the nozzle to the plurality of outlet holes is no more than 80 psi higher than the enclosure gage pressure. In some embodiments, the sound power level from the nozzle is no greater than 120 dB for a frequency range from 500 to 10,000 Hz for a coverage area up to 36 ft.×36 ft., and more preferably up to 32 ft.×32 ft. In some embodiments, the coverage area of the acoustic nozzle is at approximately 36 ft.×36 ft., more preferably approximately 32 ft.×32 ft. In addition, a maximum protection height of the acoustic nozzle is preferably up to 20 ft. Preferably, the sound power level is no greater than 130 dB for flow rates in a range of approximately 1,000 cubic feet per minute (CFM) to approximately 5,400 CFM, and more preferably at a flow rate of approximately 2,188 CFM. Preferably, the sound power from the nozzle is no greater than 125 dB for a frequency range from 500 to 10,000 Hz at a flow rate of approximately 2,188 CFM, and more preferably, no greater than 108.6 dB for a frequency range from 500 to 10,000 Hz at a flow rate of approximately 2,188 CFM.

In operation, in preferred embodiments, a flow of inert gas from the storage tanks is sent through an orifice plate that restricts the flow and pressure. In some embodiments, the orifice plate can be mounted remotely from the nozzle. In other embodiments, the orifice plate is mounted at the inlet to the nozzle. The inert gas flow then enters an axially extending passageway in the nozzle. The flow exits out of the passageway through a plurality of outlets that are disposed through a sidewall of the passageway and into an annular chamber. Preferably, the flow exits out of the plurality of outlets in a balanced manner such that the 02 content in each corner of the enclosure is reduced at approximately the same rate. Preferably, the flow is diverted through first and second sets of radially facing secondary outlets on an outer sidewall of the annual chamber. The disclosed low pressure drop acoustic suppressor nozzle reduces the sound associated with the gas discharge to acceptable levels within the operating frequency range while providing a low pressure drop that allows rapid inert gas discharge for fire suppression.

Although exemplary embodiments, as discussed below, are directed to a configuration having two flow portions exiting the nozzle through respective sets of outlet holes, nozzle configurations having one set of outlet holes or more than two flow portions can provide sound power that is preferably no greater than 130 dB, more preferably no greater than 125 dB and even more preferably no greater than 108.6 dB so long as the flows exiting the outlet holes are balanced as discussed herein.

BRIEF DESCRIPTION OF THE FIGURES

The accompanying drawings, which are incorporated herein and constitute part of this specification, illustrate exemplary embodiments of the invention, and, together with the general description given above and the detailed description given below, serve to explain the features of the invention. It should be understood that the preferred embodiments are some examples of the invention as provided by the appended claims.

Embodiments of the low pressure drop acoustic suppressor nozzle introduced herein may be better understood by referring to the following Detailed Description in conjunction with the accompanying drawings, in which like reference numerals indicate identical or functionally similar elements.

DETAILED DESCRIPTION

Exemplary embodiments of the present disclosure are directed to inert gas nozzles that suppress the sound from the nozzles to acceptable levels without the high pressure drop in the nozzle as found in prior art and related art systems. In the exemplary embodiments, the sound is reduced to acceptable levels by using only a minimal amount of sound dampening material in the flow path of the nozzle and by strategically disposing the nozzle relative to a pressure reducing device disposed upstream of the nozzle. For example, in some exemplary embodiments, the sound power level from the nozzle is no greater than 125 dB for a frequency range from 500 to 10,000 Hz for a coverage area up to 36 fl.×36 ft., and more preferably up to 32 n.×32 ft. In some exemplary embodiments, the pressure reducing device is mounted remotely from the main nozzle. In other embodiment, the pressure reducing device is mounted at the inlet of the nozzle.

Generally, when the fire suppression system is activated, the inert gas pressure in the piping upstream of the pressure reducing device, such as, e.g., an orifice, can be as high as 2,000 psi. Depending on the configuration of the enclosure being protected, the pressure reducing device reduces the pressure to achieve the required inert gas flow for the enclosure. Of course, the nozzle also introduces a pressure drop that must be accounted for. If the pressure drop in the nozzle is too high, the inert gas flow will be unable to meet design criteria for displacing the oxygen in the enclosure. In exemplary embodiments of the disclosure, the disclosed low pressure drop nozzle has a pressure drop that is no more than 80 psi higher than the enclosure gage pressure. It is believed that there is no related art fire suppression nozzle that has such a low pressure drop (preferably no more than 80 psi higher than the enclosure gage pressure), low sound generation (preferably less than 125 dB and more preferably less than 108.6 dB) and high inert gas coverage area distribution (preferably up to 36 ft.×36 ft., and more preferably up to 32 ft.×32 ft.).

Figure 1:
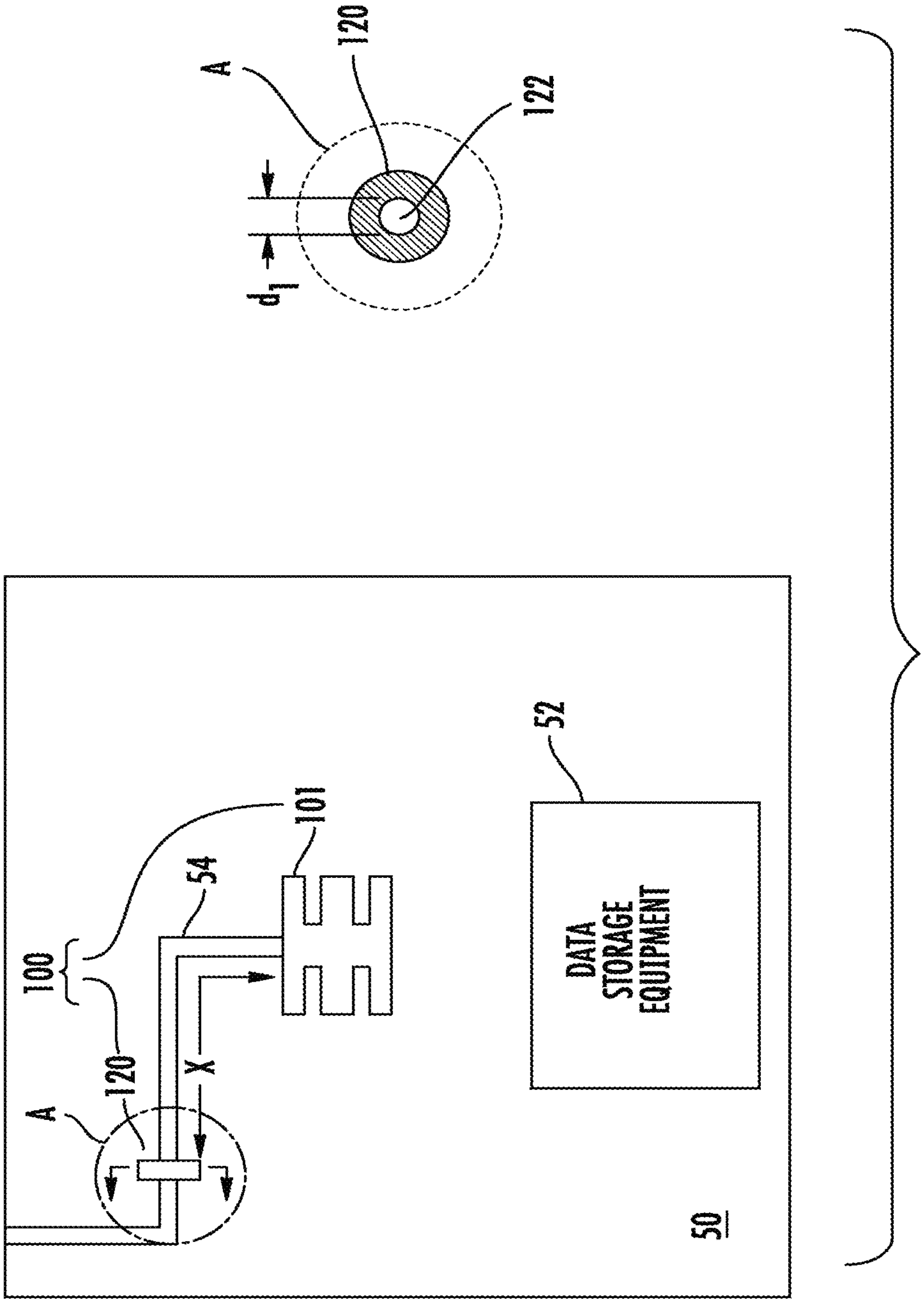
FIG. 1 shows a simplified diagram of a fire suppression system using an exemplary embodiment of a low pressure drop acoustic suppressor nozzle assembly.

As shown in FIG. 1, a nozzle assembly 100 includes a low pressure drop acoustic suppressor nozzle 101 and a pressure reducing device. The pressure reduction device can be, e.g., orifice plate 120. The nozzle assembly 100 is mounted in an enclosure 50 to protect data storage equipment 52. The nozzle assembly 100 is connected to an inert gas fire suppression system via piping 54. The configuration and operation of the fire suppression system is known in the art and thus, for brevity, will not be discussed farther. The orifice plate 120 receives high pressure gas from a fire suppression system (not shown) and the downstream pressure in the piping connected to the nozzle 101 is reduced via the orifice opening 122. When mounted remotely from the nozzle 101, the orifice plate 120 is preferably mounted in-line with the piping 54 using appropriate fitting and hardware. For example, the orifice plate 120 can be disposed in the piping, e.g., welding, soldering, or attached to the piping using fittings or other appropriate means. The orifice opening 122 is sized based on the diameter of the piping 54 and the required flow in the system based on the application. Preferably, the orifice opening 122 is 5% to 70% of the diameter of the piping 54. As seen in FIG. 1, the orifice plate 120 is disposed a distance X from the inlet 102 from the main nozzle 101. The distance X is the length of the piping from the inlet 102 and the orifice 120, i.e., distance X is the distance the gas travels in the piping. In preferred embodiments of the present disclosure, the orifice plate 120 is disposed remotely from the nozzle 101. However, in other embodiments, the orifice plate 120 can be mounted directly at the inlet 102. In some embodiments, the distance X can be up to 6 feet depending on whether the configuration of fire system in the enclosure 50. Preferably, the distance X is in a range from 30 to 50 inches and more preferably between 35 to 45 inches. In some embodiments, the distance X is 41 inches. In some exemplary embodiments, the distance X is in a range of 0 to 12 inches from the inlet 102 and more preferably 3 to 9 inches. In some embodiments, the distance X is 6 inches. Preferably, the orifice plate 120 is mounted such that there are no bends in the piping 54 from the orifice plate 120 to the inlet 102, e.g., the orifice plate can be mounted in the vertical section of piping above the nozzle 101.

Figure 2:
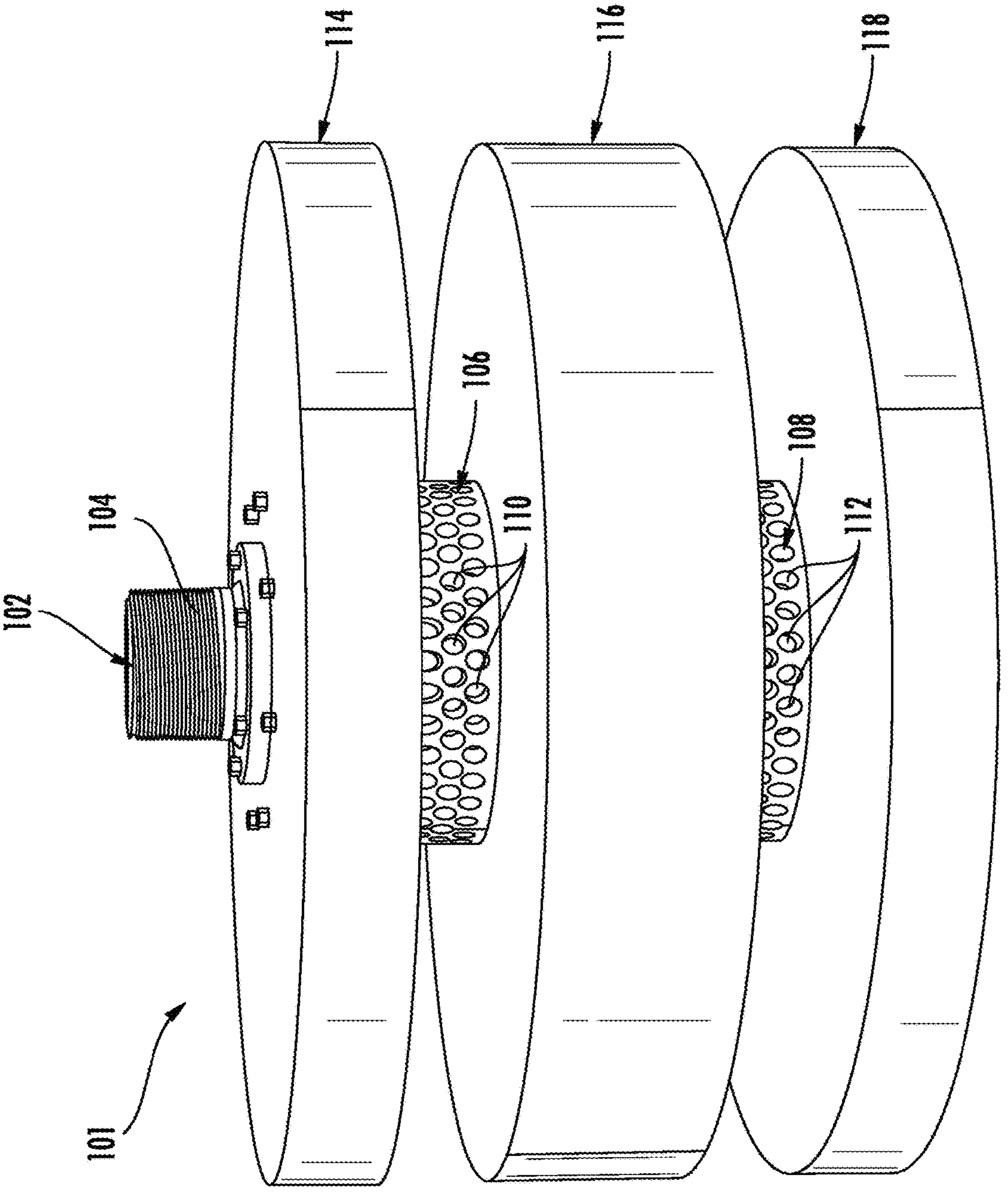
FIG. 2 is a perspective view of the low pressure drop acoustic suppressor nozzle of FIG. 1.

As seen in FIG. 2, nozzle 101 includes a fitting 104 configured to attach to the piping from the orifice plate 120. For example, fitting 104 can include male pipe threads that screw into a female coupling on the piping 54. When attaching to piping 54, appropriate adapters can be used to transition from the piping 54 and the fitting 104. Nozzle 101 includes a first set of secondary outlets 106 that includes a plurality of radially facing apertures 110. The first set of secondary outlets 106 is positioned between an inner annular disc 116 and a first outer annular disc 114. Nozzle 101 also includes a second set of secondary outlets 108 that includes a plurality of radially facing apertures 112. The second set of secondary outlets 108 is positioned between the inner annular disc 116 and a second outer annular disc 118. Broadly, the gas received through inlet 102 is divided internally, as described more fully below, and exits through the first and second sets of secondary outlets 106 and 108 between sound absorbing annular discs 114, 116, and 118.

Figure 3:
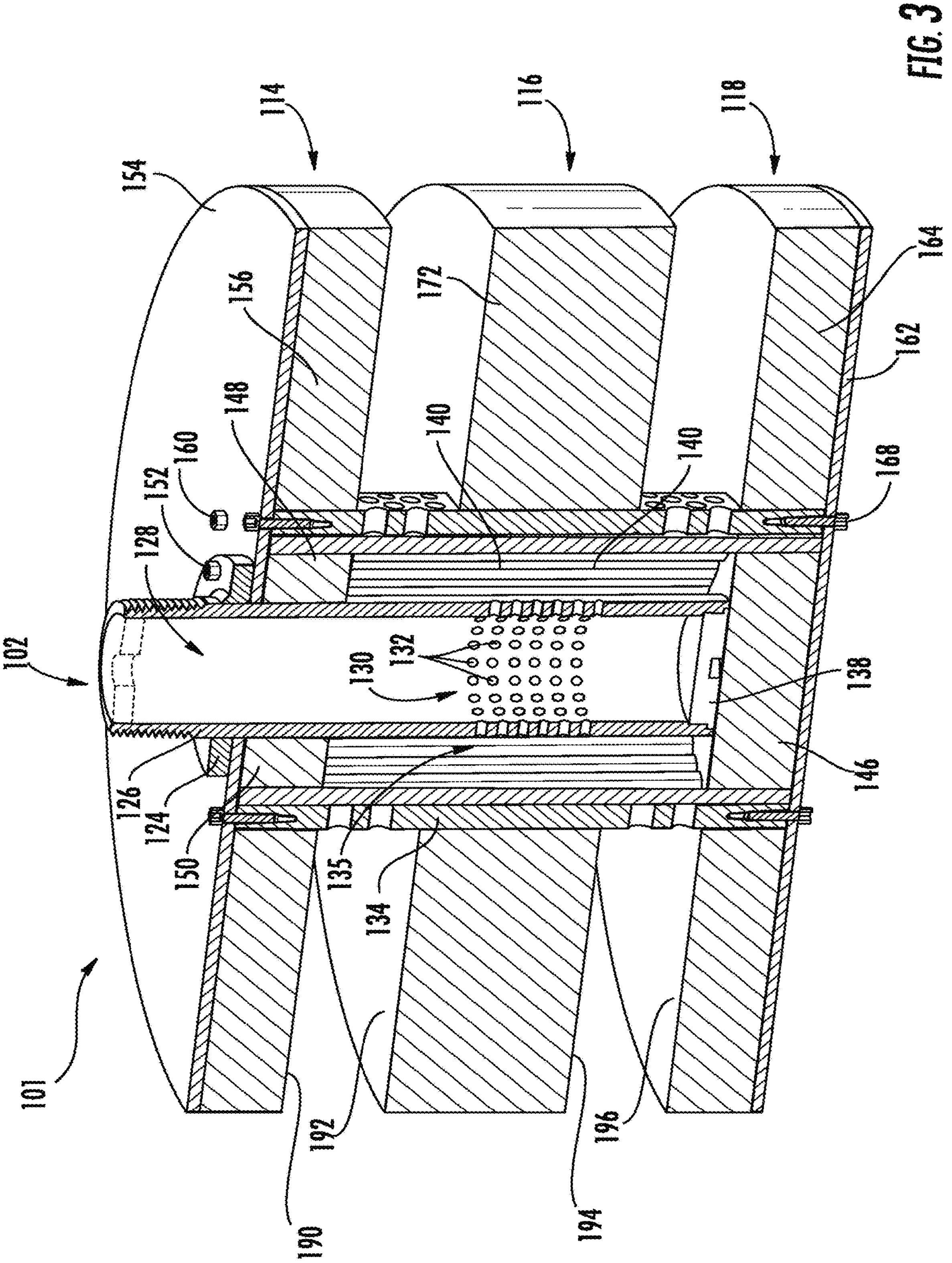
FIG. 3 is an isometric view in cross-section of the nozzle shown in FIG. 2.

With reference to FIG. 3, nozzle 101 includes a longitudinally extending inner tube 126 having an inlet 102 and defining an axially extending passageway 128. Preferably, when the orifice plate 120 is mounted at the nozzle 101, it is mounted at the inlet 102 of the passageway 128 (see orifice plate 120 with dotted outline). Preferably the inner tube 126 is a cylindrical tube or pipe, but tube 126 can have other shapes. Preferably, diameter $d_2$ (see FIG. 4) of the inlet 102 is in a range of 1.25 to 1.75 inches, and more preferably 1.5 inches. The thickness of the inner tube 126 is in a range of 0.1 to 0.3 inches and most preferably 0.2 inches. The inner tube 126 is sized and configured to contain the supersonic gas flow moving through the orifice 122 and into passageway 128. Preferably, the inner tube 126 is composed of a metal such as aluminum, bronze, stainless steel or some other metal or material appropriate for the rated temperature of the application.

Figure 5:
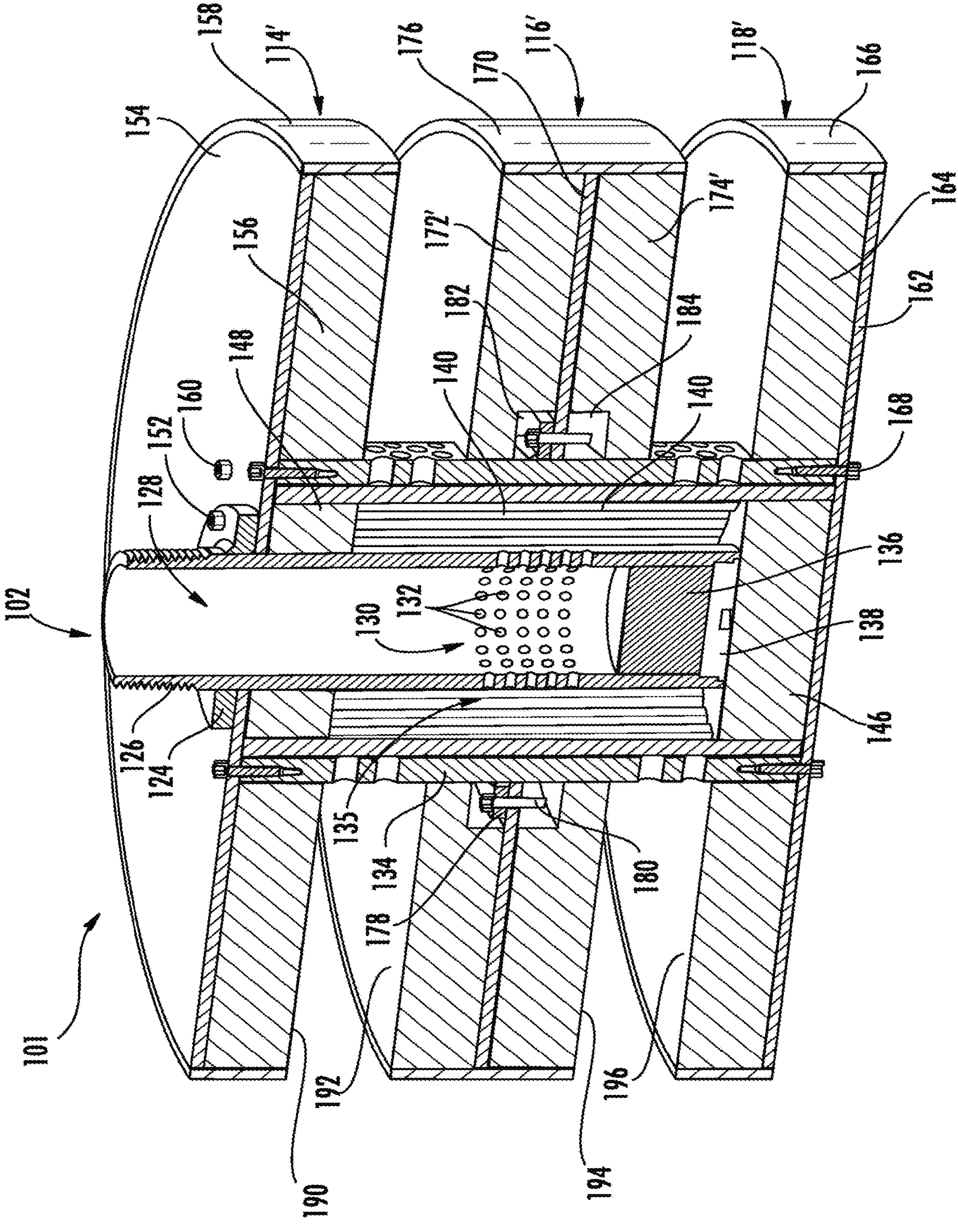
FIG. 5 is an isometric view in cross-section of another exemplary embodiment of a low pressure drop acoustic suppressor nozzle.

Inner tube 126 includes a set of primary outlets 130 that includes a plurality of radially facing primary apertures 132. In other words, the radially facing primary apertures 132 extend transversely through the sidewall of the inner tube 126. In general, smaller diameter and larger number of apertures provide better sound dissipating characteristics. Preferably, the apertures 132 of the primary outlets 130 are arranged in six rows with thirty apertures 132 in each row. Each of the apertures 132 in the respective row can be on a same plane perpendicular to a longitudinal axis of the inner tube 126. The rows can be parallel to each other. Preferably, each row is offset from its adjacent row. In some embodiments, the offset is 6 degrees. However, in some embodiments, there is no offset. i.e., the apertures 132 are in-line as shown in FIG. 3. Preferably, each aperture 132 is in a range of approximately 1/16 inch to ¼ inch in diameter and more preferably ⅛ inch in diameter. In some embodiments, all the apertures 132 are the same diameter. In some embodiments, the apertures 132 can have different diameters. However, the diameter, number, offset and arrangement of the apertures 132 of the primary outlets 130 are not limiting and the inventive nozzle 100 can include a set of primary outlets 130 having other diameter, number, offset and arrangement configurations. For example, FIG. 5 shows a primary outlets 130 configuration where five rows of apertures 132 are used instead of six. In other embodiments, the apertures 132 are not arranged in parallel rows can be arranged using other patterns or even randomly arranged. In some embodiments, the set of primary outlets 130 have a combined flow area that is greater than a flow area of the orifice 122. The combined flow area of the primary outlets 130 is determined based on the quantity of gas flow needed for a particular application. Preferably, the set of primary outlets 130 have a combined flow area in a range of approximately 7 to 11 $in^2$, and more preferably approximately 8.84 $in^2$.

A plug 138 encloses the inner tube 126 to create an inner chamber corresponding to passageway 128. In some embodiments, the plug 138 can be secured in the inner tube with suitable threads, by welding, or with a press fit, for example. In some embodiments, the inner tube 126 is manufactured such that the end of the passageway 128 is already sealed and a plug 138 is not needed. For example, the tube 126 can be formed by starting with a cylindrical blank and drilling the passageway 128 to the correct depth, such that plug 138 is not needed. The inner tube 126 includes a flange 124 that is attached to the first outer annular disc 114 an appropriate attachment means such as, snap rings, retaining rings or some other fastening means. For example, as seen in FIG. 3, the flange 124 is attached to a support plate 154 of the first outer annular disc 114 by a plurality of fasteners 152.

Figure 4:
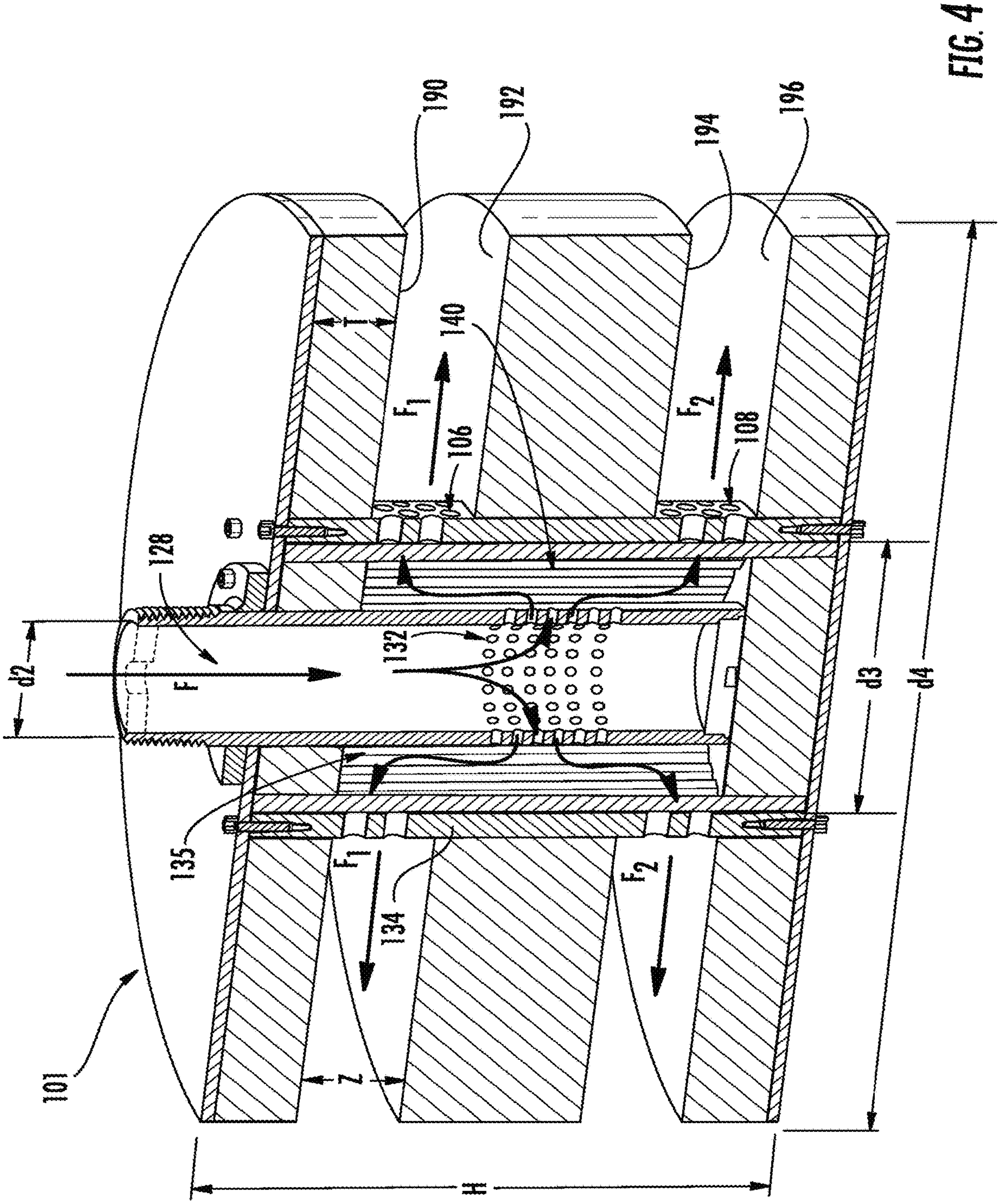
FIG. 4 is an isometric view in cross-section of the nozzle shown in FIGS. 2 and 3 illustrating fluid flow through the nozzle.

In some embodiments, a sound absorbing body 136 (see FIG. 5) is disposed in the passageway 128 that reduces the interaction between the inert gas and the nozzle 101 and reduces the sound caused by vibration of the nozzle 101. In addition, where the sound absorbing body 136 is used, the set of primary outlets 130 can be located above the sound absorbing body 136 to help balance the amount of gas flowing through the primary apertures 132 and create a uniform velocity of the inert gas. The sound absorbing body 136 can be comprised of any suitable sound absorbing material such as, e.g., high temperature, high-density rigid fiberglass insulation. An example of suitable fiberglass insulation is available from McMaster-Carr and identified as part no. 9351K1. Of course, other sound absorbing materials, such as mineral wool or some other appropriate sound absorbing material can be used. However, in other embodiments, as shown in FIGS. 3 and 4, the sound absorbing body 136 is not needed.

Inner tube 126 is surrounded by an outer tube 134 defining an annular chamber 135 that surrounds the primary outlets 132. Preferably the outer tube 134 is a cylindrical tube or pipe, but outer tube 134 can have other shapes. The outer tube 134 includes first and second sets of secondary outlets 106 and 108, respectively. Preferably, the inner diameter $d_3$ (see FIG. 4) of the outer tube 134 is in a range of 3.0 to 5.0 inches and more preferably 3.81 inches. Preferably the thickness of the inner tube 134 is in a range of 0.05 to 0.4 inches and more preferably 0.345 inches. The outer tube 134 can be composed of a metal such as aluminum, bronze, stainless steel or some other metal or material appropriate for the rated temperature of the application.

In some embodiments, the apertures 110, 112 of the secondary outlets 106, 108, respectively, are arranged in four rows with thirty-six apertures 110, 112 in each row, respectively. Each of the apertures 110, 112 in the respective row can be on a same plane perpendicular to a longitudinal axis of the outer tube 134. The rows can be parallel to each other. Preferably, each row is offset from its adjacent row. In some embodiments, the offset is 5 degrees. However, in other embodiments, the respective apertures 110, 112 are in-line with each other. Preferably, each aperture 110, 112 is in a range of approximately ⅛ inch to ½ inch in diameter and more preferably ¼ inch in diameter. In some embodiments, all the apertures 110, 112 are the same diameter, respectively with each set of outlets 106, 108 or even between outlet sets 106, 108. In some embodiments, the apertures 110, 112 can have different diameters, respectively with each set of outlets 106, 108 and/or between outlet sets 106, 108. However, the diameter, number and arrangement of the apertures 110, 112 of the secondary outlets 106, 108, respectively, are not limiting and the inventive nozzle 100 can include a set of secondary outlets 106, 108 having other diameter, number, offset and arrangement configurations. For example, in other embodiments, the apertures 110, 112 are not arranged in parallel rows and the apertures 110, 112 can be arranged using other patterns or even randomly arranged. In addition, in some embodiments, geometries other than holes can be used such as slots so long as the combined flow area of the secondary outlets 106, 108 is appropriate for the application.

In some embodiments, the first and second sets of secondary outlets 106 and 108 have a combined flow area that is greater than the combined flow area of the primary outlet 130. Preferably, the first and second sets of secondary outlets 106, 108 have a combined flow area in a range of approximately 45 to 68 $in^2$, and more preferably approximately 56.55 $in^2$. In some embodiments, the primary outlets 130 are disposed on the sidewall of the inner tube 126 such that the flow exits between the secondary outlets 106, 108. Preferably, the flow exits equidistant between the secondary outlets 106, 108. In some embodiments, the flow path from the primary outlets 130 is split into two paths each directed to the respective secondary outlets 106, 108. In some embodiments, more than two secondary outlets are provided and the flow from the primary outlet is split into more than two paths.

Preferably, a sound absorbing device is disposed in the annular chamber 135. In some embodiments, as shown in FIG. 3, the sound absorbing device includes baffle 140 and sound absorbing inserts 146 and 148 positioned at the upper and lower ends of the chamber 135. The baffle 140 is disposed inside the annular chamber 135 in the flow path of the inert gas. Preferably, the baffle 140 is cylindrical in shape and an outer surface of the baffle 140 is disposed between the sidewall of the inner tube 126 and the sidewall of outer tube 134. In some embodiments, the baffle 140 is disposed against the sidewall of the outer tube 134. Of course, the shape of the baffle is not limiting and other shapes can be used so long as the flow is not adversely restricted. The baffle 140 surrounds the radially facing primary outlets 132 and covers the inlets of the first and second sets of secondary outlets 106 and 108. Preferably, the thickness of the baffle 140 is in a range of ⅛ inch to ½ inch and, more preferably ¼ inch. Preferably, baffle 140 is disposed on support plate 162 and the length of baffle 140 extends from support plate 162 to support plate 154. The baffle 140 is made of porous material that absorbs sound. Preferably, the baffle 140 is made of porous stainless steel wool sandwiched between wire mesh. The stainless steel wool can be, e.g., medium grade 1 or 0, fine grade 00, 000 or 0000. The wire mesh is used to hold the steel wool and can have, e.g., a mesh size of 40×200. Of course, grades of steel wool and wire mesh sizes can be used as appropriate. In addition, other materials can be used for the baffle 140 such as, e.g., cloth screens, stainless steel wool between inner and outer wire cloth, perforated metals, metal foam having various geometries and pores per inch (PPI) densities, wire overlays, Scotch Brite and other screen mesh materials to name just a few. The porous material of baffle 140 helps in reducing the sound but unlike prior art nozzles, the baffle 140 does not cause a significant pressure drop and thus does not adversely affect the quick discharge of the inert gas needed to rapidly drop the oxygen level for fire suppression. This is because the restricting geometry for controlling the flow is still the orifice plate 120 disposed upstream of the nozzle inlet 102. As discussed above, the sound absorbing device can also include inserts 146 and 148. Preferably, the sound absorbing inserts 146 and 148 are disposed at a top end and a bottom end of the annular chamber 135, respectively. The sound absorbing inserts 146 and 148 help reduce the interaction between the gas flow and the nozzle 101. Preferably, the sound absorbing insert 148 is a disc with a diameter that extends to the sidewall of the baffle 140. The insert 148, along with insert 146, provides lateral support for the baffle 140. As seen in FIG. 3, the insert 148 acts as a base for the inner tube 126 and plug 138. Preferably, the sound absorbing insert 146 is a donut shaped disc with an inner diameter that circumscribes the inner tube 126. The outer diameter of the insert 146 extend to the sidewall of baffle 140 and provides lateral support to baffle 140. In some embodiments, the diameter of the sound absorbing insert 148 extends to the sidewall of the outer tube 134 (e.g., see insert 148' in FIG. 6 for comparison). In addition, the outer diameter of the insert 146 extends to the sidewall of the outer tube 134 (e.g., see insert 146' in FIG. 6 for comparison). In this case, the baffle 14 will be disposed between, e.g., sandwiched between the inserts 146 and 148. That is, the baffle 140 will be disposed on the insert 148 rather than the support plate 162 as discussed above and the top of baffle 140 will extend to insert 146 rather than to the support plate 154 as discussed above. Although described as a disc and donut shaped disc, the shape of the inserted will depend on the shape of the inner and outer tubes 126, 134. The sound absorbing inserts 146, 148 can be comprised of any suitable sound absorbing material such as, e.g., high temperature, high-density rigid fiberglass insulation.

As seen in FIG. 4, inner annular ring 116 is comprised of sound absorbing insert 172. The annular ring 116 is secure to the outer tube 134 using known fastening means such as, e.g., clips or spiral retaining rings. The sound absorbing insert 172 further reduces the sound level of the inert gas as it flows from the first and second set of secondary outlets 106 and 108 and into the enclosure. Preferably, the thickness of sound absorbing insert 172 is in a range of 0.50 inch to 2.0 inch and more preferably, 1 inch. The sound absorbing insert 172 can be any appropriate sound absorbing material such as, e.g., fiberglass and mineral wool to name just a few.

The second outer annular ring 118 is comprised of a support plate 162 and a sound absorbing insert 164. The support plate 162 can be made of any appropriate material based on the temperature requirement of the application such as, e.g., metal, including aluminum, bronze and stainless steel, plastic, fiberglass and ceramic or composites thereof to name just a few. The sound absorbing insert 164 further reduces the sound level of the inert gas as it flows from the second set of secondary outlets 108 and into the enclosure. Preferably, the thickness of sound absorbing insert 164 is in a range of 0.25 inch to 1.00 inch and more preferably, 0.50 inch. The sound absorbing insert 164 can be any appropriate sound absorbing material such as, e.g., fiberglass and mineral wool to name just a few. The second outer annular disc 118 is attached to one end of the outer tube 134 with, e.g., a plurality of fasteners 168 or by some other means. First outer annular disc 114 includes a support plate 154 and a sound absorbing insert 156. The support plate 154 can be made of any appropriate material based on the temperature requirement of the application such as, e.g., metal, including aluminum, bronze and stainless steel, plastic, fiberglass and ceramic or composites thereof to name just a few. The sound absorbing insert 156 further reduces the sound level of the inert gas as it flows from the first set of secondary outlets 106 and into the enclosure. Preferably, the thickness of sound absorbing insert 156 is in a range of 0.25 inch to 1.0 inch and more preferably, 0.5 inch. The sound absorbing insert 156 can be any appropriate sound absorbing material such as, e.g., fiberglass and mineral wool to name just a few. The first outer annular disc 114 is attached to another end portion of the outer tube 134 with, e.g., a plurality of fasteners 160 or by some other means.

In another exemplary embodiment, as seen in FIG. 5, the inner annular disc 116' includes a support plate 170 that attaches to a flange 178. Flange 178 is secured to the outer tube 134, e.g., by welding or by some other means that secures the flange 178 to outer tube 134. Support plate 170 can be made of any appropriate material based on the temperature requirement of the application such as, e.g., metal, including aluminum, bronze and stainless steel, plastic, fiberglass and ceramic or composites thereof to name just a few. Support plate 170 is attached to flange 178 with a plurality of fasteners 180. Inner annular disc 116' also includes a hoop 176 attached to the support plate 170. A pair of sound absorbing inserts 172' and 174' are placed against the support plate 170. The sound absorbing inserts 172' and 174' further reduce the sound level of the inert gas as it flows from the first and second set of secondary outlets 106 and 108 and into the enclosure. Inserts 172' and 174' may be tightly fit within the hoop 176 and/or retained within the hoop by a suitable adhesive. Clearance is provided for fasteners 180 and flange 178 by clearance cavities 182 and 184 formed in the inserts 172' and 174', respectively. Preferably, the thickness of each of sound absorbing inserts 172', 174' is in a range of 0.25 inch to 1.0 inch and more preferably, 0.5 inch. The sound absorbing inserts 172', 174' can be any appropriate sound absorbing material such as, e.g., fiberglass and mineral wool to name just a few. The second outer annular ring 118' is comprised of a support plate 162, a hoop 166, and a sound absorbing insert 164. Insert 162 may be tightly fit within the hoop 166 and/or retained within the hoop by a suitable adhesive. The remaining structure of annular ring 118' is similar to annular ring 118 discussed above and thus, for brevity, will be omitted. First outer annular disc 114' includes a support plate 154, a surrounding hoop 158 and a sound absorbing insert 156. Insert 156 may be tightly fit within the hoop 158 and/or retained within the hoop by a suitable adhesive. The remaining structure of annular ring 114' is similar to annular ring 114 discussed above and thus, for brevity, will be omitted.

When the fire suppression system is operated, as seen in, e.g., the exemplary embodiment of FIG. 4, a high velocity fluid flow F passes through orifice 122 and is received into passageway 128. The fluid flow F is then redirected in a direction transverse to the longitudinal passage 128 by plug 138 (and/or the sound absorbing body 136 in some embodiments) such that the fluid flow F passes through the radially facing primary outlets 132. As fluid flow F flows through the primary outlets 132, it is divided in chamber 135 into first and second fluid flow portions F1 and F2, respectively. In some embodiments, first fluid flow portion F1 and second fluid flow portion F2 are balanced. Preferably, the fluid flow portions F1 and F2 are balanced regardless of the orientation and configuration of the outlets along the longitudinal axis of the chamber 135. Preferably, a ratio between the maximum flow value and the minimum flow value between the two balanced fluid flow portions F1 and F2 is less than 70:30, and more preferably, less than 60:40, and even more preferably, the two balanced gas flow portions F1 and F2 are substantially equal. In some embodiments, the fluid flows F1 and F2 are balanced by the location of the first and second set of secondary outlets 106 and 108 with respect to the primary outlets 132. In embodiments that use inner ring 200 (see FIG. 6), the inner ring 200 can be adjusted up or down to adjust the flow. In still other embodiments, the balancing is affected by adjusting the size of the fluid flow area for each of the secondary outlets 106, 108. Turning to the embodiment of FIG. 4, before flowing through the first and second secondary outlets 106, 108, however, the first and second fluid flow portions F1 and F2 pass through the sound absorbing baffle 140. The sound absorbing baffle 140 reduces the sound in the fluid flow portions F1 and F2, but unlike prior art nozzles, the baffle 140 does not significantly reduce the flow of fluid flow portions F1 and F2. Preferably, a pressure from the inlet 102 of the nozzle (after the orifice plate 120) is no more than 80 psi higher than the gage pressure of enclosure 50. After flowing through the baffle 140, the fluid flow portions F1 and F2 flow through the first and second secondary outlets 106, 108, respectively. As it exits the first secondary outlets 106, the first fluid flow portion F1 is directed between sound absorbing surfaces 190 and 192 of inserts 156 and 172, respectively, which further reduce the sound. Similarly, as it exits the second secondary outlets 108, the second fluid flow portion F2 is directed between sound absorbing surfaces 194 and 196 of inserts 172 and 164, respectively, which further reduce the sound.

As shown in FIG. 4, nozzle 101 has an overall height H and an overall diameter $d_4$. The inlet passageway 128 has an inlet 102 with a diameter $d_2$ and the outer tube 134 has an inner diameter $d_3$. Annular discs 114, 118 have a sound absorbing insert thickness T and annular disc 116 has a sound absorbing insert thickness of 2T and each sound absorbing surface 192-196 is spaced apart by a distance Z. In some embodiments, both the thickness T and spacing Z are in arrange of approximately 0.25 inch to 1.0 inch, and preferably 0.50 inch. In at least one embodiment, the height H is in a range of approximately 4 inches to 9 inches, and preferably 5.5 inches. The diameter $d_4$ is in a range of approximately 6 inches to 13 inches and preferably 5.5 inches. The inner tube diameter $d_2$ is in a range of approximately 1.25 inches to 1.75 inches and preferably 1.5 inches. The outer tube diameter $d_3$ is in a range of approximately 3 inches to 4 inches and preferably 3.81 inches. In some embodiments, the following ratios can apply to the dimensions of the nozzle: $d_4/d_1$, relates the diameter of the nozzle to the inert gas flow is greater than 15 and preferably in a range of approximately 15 to 30; $d_3/d_2$, which ensures the chamber 135 is sufficiently large enough for the inert gas flow is in a range of approximately 2 to 3; and $d_4/T$, which ensures a sufficient sound absorbing capacity at the outlet of the nozzle is less than 20.

Figure 6:
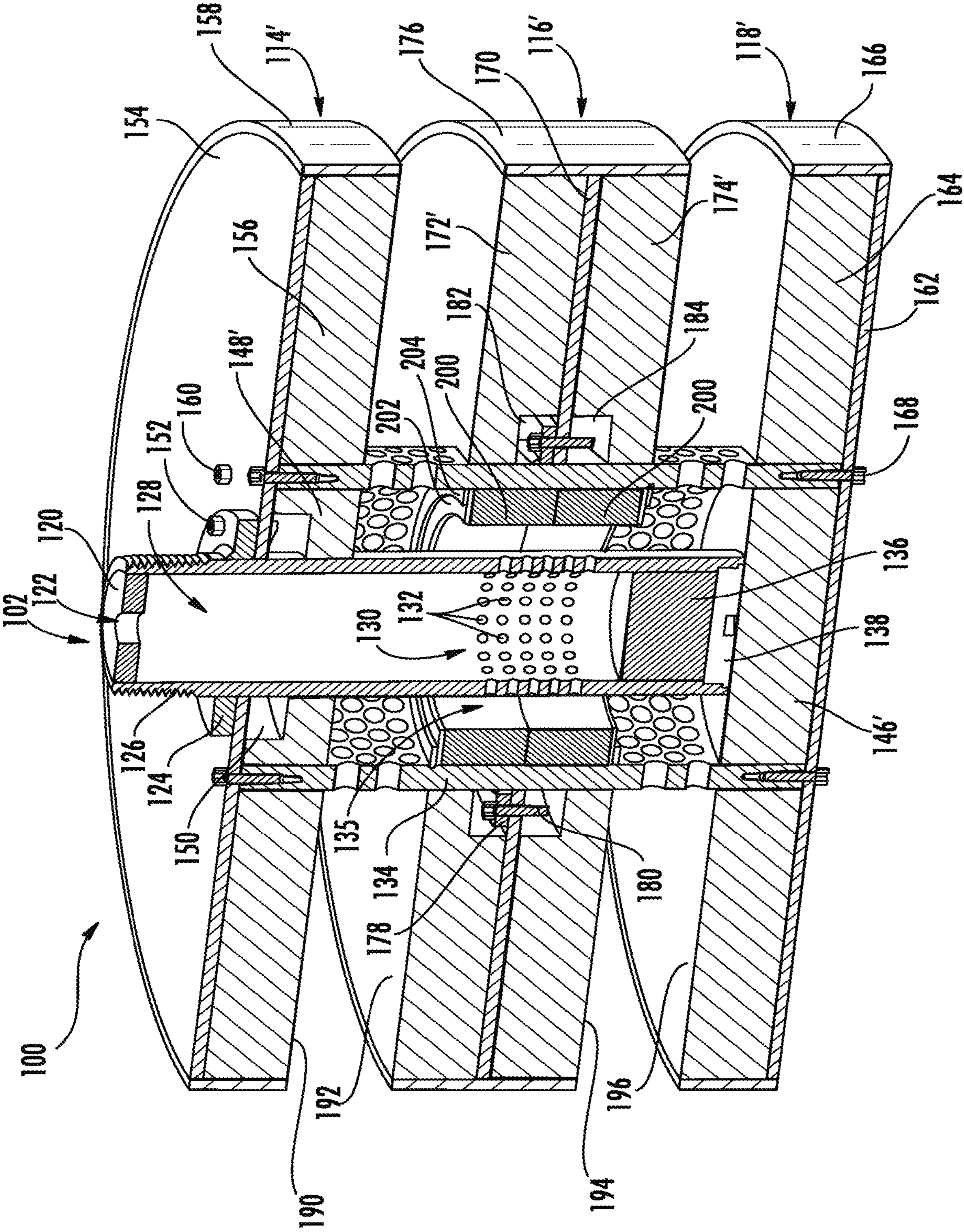
FIG. 6 is an isometric view in cross-section of another exemplary embodiment of a low pressure drop acoustic suppressor nozzle assembly.

Although the low pressure drop acoustic suppressor nozzle 100 is shown and described in the above exemplary embodiments as having cylindrical components, other suitable shapes can be used to construct the nozzle components. In addition, although the above exemplary embodiments were described with a sound absorbing device having a porous baffle 140, some embodiments of the sound absorbing device do not use a porous baffle. For example, in some embodiments, the sound absorbing device in the annual chamber 135 can include a non-porous material can be used to divert the flow of gas from primary outlets 130 to secondary outlets 106, 108. For example, FIG. 6 illustrates an embodiments in which the sound absorbing device includes a non-porous sound absorbing ring (or rings). Because many of the structures and features of the nozzle of FIG. 6 is similar to the structures and features discussed above with respect to FIGS. 2-5, for brevity, a detailed description of the common features discussed above is omitted. As shown in FIG. 6, a sound absorbing body 136 is disposed in the passageway 128 to reduce the interaction between the entering gas and the nozzle and to reduce the sound caused by the vibration of the nozzle. The set of primary outlets 130 can be located above the sound absorbing body 136 to help balance the amount of gas flowing through the primary apertures 132 and reduce the velocity of the gas flow. When the gas exits the passageway 128 through primary outlets 130, a pair of sound absorbing rings 200 are positioned inside the annular chamber 135 between the first and second sets of secondary outlets 106 and 108. Accordingly, the sound absorbing rings 200 surround the radially facing primary outlets 132. The sound absorbing rings 200 reduce the interaction between the gas flow and the outer tube 134. In some embodiments, the sound absorbing rings 200 can be adjusted in size and position to help balance the gas flow through the first and second sets of secondary outlets 106 and 108. The fluid flows may be balanced by moving the rings 200 up and down with respect to the primary outlets 132. In some embodiments, the fluid flows are balanced by the location of the first and second set of secondary outlets 106 and 108 with respect to the primary outlets 132. In still other embodiments, the balancing is affected by the size of the secondary outlets. Preferably, the nozzle provides the balanced flow regardless of the orientation and configuration of the secondary outlets 106 and 108 along the longitudinal axis of the chamber 135. Preferably, a ratio between the maximum flow value and the minimum flow value between the two balanced fluid flow portions is less than 70:30, and more preferably, less than 60:40, and even more preferably, the two balanced gas flow portions are substantially equal. The sound absorbing rings 200 can be retained in the outer tube 134 with washers 202 and snap rings 204, for example. Although the rings 200 are described as two separate rings, in some embodiments the pair of sound absorbing rings can be combined into a single unitary body. Annular chamber 135 includes sound absorbing inserts 146' and 148' positioned at the ends of the chamber to help reduce the interaction between the gas flow and the nozzle. The configurations of the inserts 146' and 148' in the chamber 135 can be similar to the configuration of inserts 146 and 148 and thus for brevity will not be discussed further. The sound absorbing body 136 and rings 200 can be comprised of any suitable sound absorbing material such as, e.g., fiberglass or mineral wool to name just a few. In some embodiments, depending on the application, the inventive nozzle does not include the baffle 140, the sound absorbing body 136 or the sound absorbing rings 200. Although described separately in the above exemplary embodiments, some embodiments can include both the baffle 140 and ring 200. In addition, some embodiments do not include either the baffle 140 or the ring 200.

The exemplary embodiments discussed above are directed to a configuration having two flow portions exiting the nozzle through respective sets of outlet holes. However, exemplary embodiments of the nozzle are not limited to this configuration. In some embodiments, the nozzle can be configured with more than two sets of secondary outlet holes similar to outlets 106 and 108. In still other embodiments, the chamber 135 has one set of secondary outlet holes which are disposed along a longitudinal axis of chamber 135. Preferably, the exemplary nozzles are configured to provide balanced flow regardless of the orientation and configuration of the plurality of outlet holes along the longitudinal axis. For example, the nozzles are configured such that gas exiting a plurality of outlet holes is balanced such that a ratio between a maximum flow value in the plurality of outlet holes and a minimum flow value in the plurality of outlet holes is less than 70:30, and more preferably 60:40 and even more preferably substantially equal.

Figure 7:
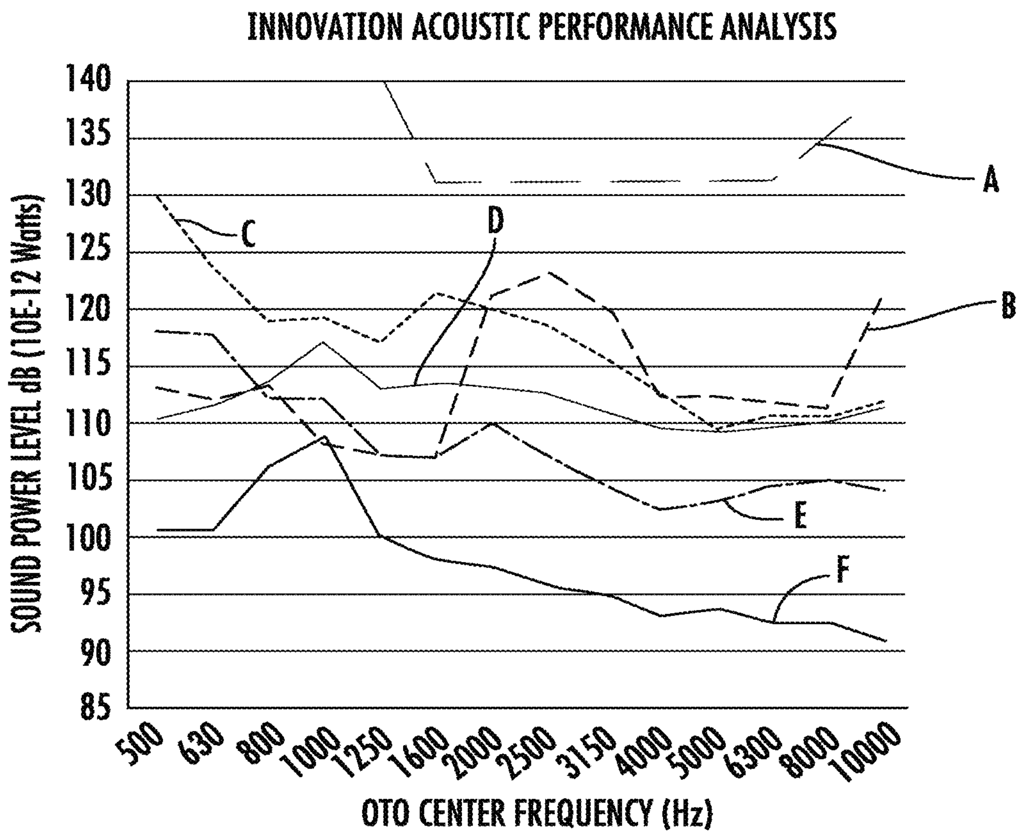
FIG. 7 shows a chart illustrating failure and 50% degradation graphs for hard drives in terms of sound power level vs. frequency for various exemplary low pressure drop acoustic suppressor nozzles.

In the above exemplary embodiments, the sound power of nozzle 101 is no greater than 130 dB for a frequency range from 500 to 10,000 Hz for inert gas flow rates in a range of approximately 1,000 CFM to approximately 5,400 CFM while conforming to the standards in UL 2127. In some exemplary embodiments, the peak value of the sound power level of nozzle 101 is no greater than 130 dB, preferably no greater than 120 dB, and more preferably no greater than 111 dB, for a frequency range from 500 to 10,000 Hz for inert gas flow rates in a range of approximately 950 CFM to approximately 5,400 CFM while conforming to the standards in UL 2127. In some exemplary embodiments, the peak sound power level of nozzle 101 is in a range between 111 dB to 130 dB, for a frequency range from 500 to 10,000 Hz for inert gas flow rates in a range of approximately 950 CFM to approximately 5,400 CFM while conforming to the standards in UL 2127. For example, FIG. 7 shows a chart illustrating sound power level in dB vs. frequency in Hz for various embodiments with and without baffle 140 and with and without an offset for the orifice plate 120. For the embodiments shown in FIG. 7, INERGEN gas at a flow rate of 2,188 CFM and an orifice of 0.368 was used. The line A represents a graph of a sound level vs. frequency at which failure of a hard drive is believed to occur. Line B represents a graph of the sound level vs. frequency at which a 50% degradation of the performance of the hard drive is believed to occur. As seen in FIG. 7, exemplary embodiments of the present disclosure reduce the sound power levels such that they are at 130 dB or below, i.e., below the level at which failure of the HDD is believed to occur, for frequencies from 500 to 10,000 Hz. For example, Line C represents a nozzle which does not include either a remotely disposed orifice plate or a baffle with sound absorbing material. The sound power level for this embodiment never reaches the believed failure point of Line A. Some exemplary embodiments provide even better results with sound power levels they are below 125 dB. For example, Line D represents a nozzle in which an orifice plate is disposed 41 inches upstream from the inlet to the nozzle but does not have a baffle with sound absorbing material. The sound power level for Line D is generally better than Line C, especially from 500 to approximately 5,000 Hz, and Line D has a peak value at 1000 Hz that is less than 125 dB. The sound power level of the exemplary embodiment represented by Line D is also at or below the 50% degradation Line B for frequencies in a range of approximately 500 to 800 Hz and approximately 2000 to 10,000 Hz. Line E represents a nozzle that includes a baffle with sound absorbing material but the orifice plate is not remotely disposed. The sound power level for Line E is better than Line D for frequencies ranging from approximately 800 to 10,000 Hz, and the peak value of Line E at 500 Hz is also below 125 dB. In addition, the sound level for Line E is below the 50% degradation Line B from approximately 1,600 to 10,000 Hz and significantly below Line B from approximately 2,000 to 10,000 Hz. Further exemplary embodiments provide even sound power levels that are at 108.6 dB or below. For example, Line F embodies a nozzle that is disposed 41 inches upstream from the inlet to the nozzle and includes a baffle with sound absorbing material in the nozzle. As seen in FIG. 7, except for a short peak of approximately 108.6 dB at approximately 1,000 Hz where Line F just touches the 50% degradation Line B, Line F is significantly below the 50% degradation Line B for all other frequencies.

As discussed above, hard disk drives are susceptible to sound, and a high sound level can lead to degradation or, in some cases, failure. The exemplary embodiments disclosed above reduce or minimize the probability of degradation or failure of the hard disk drives while conforming to the standards in UL 2127. For example, in some embodiments, the sound power from the acoustic nozzle 101 is no greater than 125 dB for a frequency range from 500 to 10,000 Hz for a coverage area up to 36 ft.×36 ft., and more preferably up to 32 ft.×32 ft., and more preferably, no greater than 120 dB. It is believed that there is no related art fire suppression nozzle meeting the UL 2127 standard generates a sound power level that is at 125 dB or less at any coverage area up to 36 ft.×36 ft., and more preferably up to 32 ft.×32 ft. In some exemplary embodiments, the acoustic nozzle 101 is no greater than 130 dB, and more preferably, no greater than 108.6 dB, for a frequency range from 500 to 10,000 Hz for a coverage area up to 36 ft.×36 ft. and more preferably up to 32 ft.×32 ft. In the above exemplary embodiments, the maximum protection height of the acoustic nozzle 101 is up to 20 ft.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A fire suppression nozzle, comprising:
- a first conduit comprising an inlet and an outlet;
- a second conduit coupled to the first conduit and comprising a first plurality of outlets spaced apart from a second plurality of outlets along a length of the second conduit by a middle portion of the second conduit with no outlets, wherein the first plurality of outlets and the second plurality of outlets connect directly to an environment surrounding the nozzle;
- a first circular sound absorbing member positioned on a first side of the outlet; and
- a second circular sound absorbing member positioned on a second side of the outlet;
- wherein each of the first circular sound absorbing member and the second circular sound absorbing member comprise:
  - a support plate; and
  - a sound absorbing insert, wherein the sound absorbing insert is composed of a sound absorbing material;
- wherein the first conduit is configured to receive an inert gas at the inlet and provide the inert gas to an interior of the second conduit via the outlet at a location between a first end of the second conduit and a second end of the second conduit, wherein the location is aligned with the middle portion;
- wherein the first conduit and the second conduit are configured such that the inert gas exits the outlet in a first direction and a first portion of the inert gas is directed toward the first plurality of outlets in a second direction, and a second portion of the inert gas is directed toward the second plurality of outlets in a third direction opposite the second direction, wherein the second and third directions are generally perpendicular to the first direction, and
- wherein a first flow rate of the first portion of the inert gas and a second flow rate of the second portion of the inert gas are substantially equal.

2. The fire suppression nozzle of claim 1, wherein the outlet of the first conduit is aligned with an approximate midpoint of the length of the second conduit.

3. The fire suppression nozzle of claim 1, wherein the first plurality of outlets and the second plurality of outlets extend radially through the second conduit.

4. The fire suppression nozzle of claim 1, wherein the fire suppression nozzle is configured to be disposed within an enclosure, such that during discharge a pressure drop from the inlet to the first plurality of outlets and the second plurality of outlets is no more than 80 psi higher than a gage pressure of the enclosure.

5. The fire suppression nozzle of claim 1, wherein a ratio between a first flow value for the first portion of the inert gas and a second flow value for the second portion of the inert gas is less than 60:40.

6. The fire suppression nozzle of claim 1, wherein the first circular sound absorbing member is positioned on the first side of the outlet proximate the first end of the second conduit and the second circular sound absorbing member is positioned on the second side of the outlet proximate the second end of the second conduit.

7. The fire suppression nozzle of claim 1, wherein a first direction of flow of the inert gas through the inlet is perpendicular to a second direction of flow of the first plurality of outlets and the second plurality of outlets.

8. The fire suppression nozzle of claim 1, wherein the first plurality of outlets are positioned in a first end portion of the second conduit and separated from the second plurality of outlets positioned in a second end portion of the second conduit by the middle portion.

9. The fire suppression nozzle of claim 1, wherein the inert gas is prevented from exiting the nozzle in the middle portion.

10. The fire suppression nozzle of claim 1, wherein during discharge of the inert gas from the first plurality of outlets and the second plurality of outlets, a sound power level at the fire suppression nozzle is less than 125 dB.

11. A fire suppression nozzle comprising:
- a first conduit comprising an inlet and an outlet;
- a second conduit coupled to the first conduit and comprising a first plurality of outlets spaced apart from a second plurality of outlets along a length of the second conduit by a middle portion of the second conduit with no outlets;
- a first circular sound absorbing member positioned on a first side of the outlet; and
- a second circular sound absorbing member positioned on a second side of the outlet;
- wherein the first conduit is configured to receive an inert gas at the inlet and provide the inert gas to an interior of the second conduit via the outlet at a location between a first end of the second conduit and a second end of the second conduit, wherein the location is aligned with the middle portion; and
- wherein the first conduit and the second conduit are configured such that the inert gas exits the outlet in a first direction and a first portion of the inert gas is directed toward the first plurality of outlets in a second direction, and a second portion of the inert gas is directed toward the second plurality of outlets in a third direction opposite the second direction, wherein the second and third directions are generally perpendicular to the first direction,
- wherein during discharge of the inert gas from the first plurality of outlets and the second plurality of outlets, a sound power level at the fire suppression nozzle is less than 125 dB for a frequency range from 500 to 10,000 Hz at a flow rate greater than 1,000 cubic feet per minute.

12. A fire suppression nozzle, comprising:
- a first conduit comprising an inlet and an outlet and configured to be coupled to distribution piping and receive an inert gas;
- a second conduit coupled to the first conduit, the second conduit comprising a first plurality of outlets spaced apart from a second plurality of outlets along a length of the second conduit by a middle portion of the second conduit, wherein the first plurality of outlets and the second plurality of outlets provide a plurality of second flow paths orientated perpendicular to a first flow path between the inlet and the outlet;

a first sound absorbing member positioned on a first side of the outlet;

a second sound absorbing member positioned on a second side of the outlet;

wherein the first sound absorbing member and the second sound absorbing member reduce a sound power level of the inert gas after existing the outlet, and wherein each of the first sound absorbing member and the second sound absorbing member comprise:

a support plate; and a sound absorbing insert, wherein the sound absorbing insert is composed of a sound absorbing material;

wherein the first conduit and the second conduit are configured such that the inert gas exits the outlet in a first direction and is directed in a second direction perpendicular to the first direction prior to a first portion of the inert gas exiting the first plurality of outlets directly to an external environment surrounding the nozzle and a second portion of the inert gas exiting the second plurality of outlets directly to the external environment;

wherein the inert gas is prevented from exiting the second conduit to the external environment within the middle portion, and wherein a first volume of the first portion of the inert gas and a second volume of the second portion of the inert gas are substantially equal.

13. The fire suppression nozzle of claim 12, wherein the outlet of the first conduit is aligned at an approximate midpoint between the first plurality of outlets and the second plurality of outlets.

14. The fire suppression nozzle of claim 12, wherein the first plurality of outlets and the second plurality of outlets extend radially through the second conduit.

15. The fire suppression nozzle of claim 12, wherein the first sound absorbing member is positioned proximate a first end of the second conduit and the second sound absorbing member is positioned proximate a second end of the second conduit.

16. The fire suppression nozzle of claim 12, wherein a first direction of flow of the inert gas at the inlet is perpendicular to a second direction of flow of the inert gas at the first plurality of outlets and the second plurality of outlets.

17. A fire suppression nozzle, comprising:

a first conduit comprising an inlet and an outlet and configured to be coupled to distribution piping and receive an inert gas;

a second conduit coupled to the first conduit, the second conduit comprising a first plurality of outlets spaced apart from a second plurality of outlets along a length of the second conduit by a middle portion of the second conduit, wherein the first plurality of outlets and the second plurality of outlets provide a plurality of second flow paths orientated perpendicular to a first flow path between the inlet and the outlet;

a first sound absorbing member positioned on a first side of the outlet;

a second sound absorbing member positioned on a second side of the outlet;

wherein the first sound absorbing member and the second sound absorbing member reduce a sound power level of the inert gas after existing the outlet, and wherein each of the first sound absorbing member and the second sound absorbing member comprise:

a support plate; and a sound absorbing insert, wherein the sound absorbing insert is composed of a sound absorbing material;

wherein the first conduit and the second conduit are configured such that the inert gas exits the outlet in a first direction and is directed in a second direction perpendicular to the first direction prior to a first portion of the inert gas exiting the first plurality of outlets and a second portion of the inert gas exiting the second plurality of outlets; and wherein the inert gas is prevented from exiting the second conduit to an external environment surrounding the nozzle within the middle portion, wherein during discharge of the inert gas from the first plurality of outlets and the second plurality of outlets, the first sound absorbing member and the second sound absorbing member reduce the sound power level to less than 125 dB for a frequency range from 500 to 10,000 Hz.

18. A fire suppression nozzle, comprising:

a first conduit comprising an inlet and an outlet, the inlet configured to receive an inert gas;

a second conduit coupled to the first conduit and comprising a first plurality of outlets spaced apart from a second plurality of outlets along a length of the second conduit by a portion of the conduit without outlets to an external environment surrounding the nozzle, wherein the first plurality of outlets and the second plurality of outlets connect directly to an environment surrounding the nozzle;

a sound absorbing circular member positioned after the outlet, such that the inert gas flows proximate the sound absorbing circular member as the inert gas exists the second conduit, wherein the sound absorbing circular member comprises a support plate and a sound absorbing insert composed of a sound absorbing material; and wherein the inert gas is precluded from exiting the second conduit at a position longitudinally aligned with the outlet of the first conduit, and wherein the inert gas exits the first plurality of outlets and the second plurality of outlets in a substantially at substantially equal flow rates.

19. The fire suppression nozzle of claim 18, wherein during discharge a pressure difference between a pressure at the inlet and a gage pressure of an environment around the fire suppression nozzle is no more than 80 psi.

20. The fire suppression nozzle of claim 18, wherein the inert gas is prevented from flowing in a straight line through the outlet of the first conduit and at least one of the first plurality of outlets or the second plurality of outlets.

21. The fire suppression nozzle of claim 18, wherein the outlet of the first conduit is aligned at an approximate midpoint between the first plurality of outlets and the second plurality of outlets.

22. The fire suppression nozzle of claim 18, wherein the inert gas is directed towards the first plurality of outlets and the second plurality of outlets in a third plurality of directions, the third plurality of directions perpendicular to a first direction of flow at the outlet.

23. A fire suppression nozzle, comprising:

a first conduit comprising an inlet and an outlet, the inlet configured to receive an inert gas;

a second conduit coupled to the first conduit and comprising a first plurality of outlets spaced apart from a second plurality of outlets along a length of the second conduit, wherein the first plurality of outlets and the second plurality of outlets connect directly to an environment surrounding the nozzle;

a sound absorbing circular member positioned after the outlet, such that the inert gas flows proximate the sound absorbing circular member as the inert gas exists the second conduit, wherein the sound absorbing circular member comprises a support plate and a sound absorbing insert composed of a sound absorbing material; and wherein the inert gas is precluded from exiting the second conduit at a position longitudinally aligned with the outlet of the first conduit, wherein during discharge of the inert gas a first flow rate of the inert gas through the first plurality of outlets and a second flow rate of the inert gas through the second plurality of outlets are substantially equal, and wherein the sound absorbing circular member is configured to limit a sound power level at the nozzle to a maximum of 125 dB.

* * * * *